United States Patent Office 2,703,797
Patented Mar. 8, 1955

2,703,797

SURFACE-ACTIVE COMPOSITIONS

Herbert L. Sanders, Phillipsburg, N. J., assignor to General Aniline & Film Corporation, New York, N. Y., a corporation of Delaware No Drawing. Application December 15, 1949,
Serial No. 133,223

9 Claims. (Cl. 260—102)

This invention relates to novel surface-active compositions, and to a process for their preparation.

The compositions of this invention are N-polyethenoxy derivatives of dehydroabietinyl primary amine. Dehydroabietinyl primary amine corresponds to dehydroabietic acid in which the carboxyl group is replaced by a primary amino methyl group. Thus, the primary amine from which the compositions of this invention are derived apparently corresponds to the following formula:

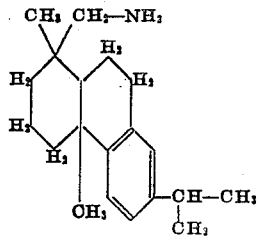

The compositions of this invention are the condensation products of the aforesaid amine with 4 to 40 molecular equivalents of ethylene oxide. Condensation of ethylene oxide with the aforesaid primary amine results in replacement of at least one of the hydrogens of the amino group, and generally both of them, by a polyethenoxy chain radical. The compositions are conveniently obtained by introducing ethylene oxide into dehydroabietinyl amine in the presence of a catalyst promoting the formation of polyethenoxy chains, particularly an alkaline material such as an alkali metal alcoholate or hydroxide, advantageously at a temperature from 120–180° C., until 4 to 40 mols of ethylene oxide are absorbed. Similar products can be produced by condensing the aforesaid amine with ethylene glycol, a polyethylene glycol or an ethylene halohydrin (e. g., ethylene chlorohydrin) instead of ethylene oxide. Condensation of glycol or polyglycol with the amine can be effected by heating in the presence of a dehydration catalyst such as bleaching earth, active carbon black and the like, while ethylene halohydrins can be condensed with the amine in the presence of alkaline materials serving as hydrogen-halide acceptors.

The condensation products thus obtained are viscous liquids to waxy solids, soluble in water and showing surface-active properties therein. Compositions in which the number of ethylene oxide radicals per mol of amine is near the lower end of the range specified above are oil-soluble as well as water-soluble.

Those compositions which contain 8 to 30 ethylene oxide radicals per mol of amine have outstanding detergent properties, especially in washing cellulosic materials such as cotton. For general utility as detergents, those products having 8 to 15 ethylene oxide radicals per mol of amine are preferred. Compositions having 8 to 30 ethylene oxide radicals per mol of amine are also soluble in aqueous hydrochloric acid (e. g. having a concentration of 15%), and are effective as inhibitors in the pickling of ferrous metals. For the latter purpose, products having 16 to 30 mols of ethylene oxide per mol of amine are generally preferred.

Condensation products having 35 to 40 mols of ethylene oxide per mol of amine are valuable as emulsion breakers for water-in-oil emulsions of the type encountered in petroleum refining.

The following examples, wherein parts are by weight, illustrate a preferred method for preparing the condensation products of the invention.

EXAMPLE 1

59 parts of dehydroabietinyl amine (e. g. a commercial product known as "Rosin Amine D") in admixture with 0.18 part of sodium methylate, were heated at 155–165° C., and 101.7 parts of ethylene oxide were passed into the mixture over a period of 5¾ hours at a gauge pressure of 5 to 10 cms. of mercury. A water-soluble product was thus obtained having an average of 8 to 9 ethylene oxide radicals per molecule. The product was a viscous liquid of light tan color and possessed only a slight odor.

The product of this example was subjected to a Launderometer test in which its washing power for cotton goods was compared under similar test conditions with the acetate of the intermediate dehydroabietinyl amine, and with a commercial alkylphenol polyglycol ether noted for exceptional detergent properties. The cotton cloth employed in the test was soiled so as to provide a reflectance of 52%. Concentrations of the various detergents ranged from 0.05 to 0.5%. After washing with the aforesaid detergent, it was found that the N-polyethenoxylated dehydroabietinyl amine of this example, as well as the alkylated phenol polyglycol ether, increased the reflectance of the cloth to 66 to 69%, whereas the acetate of dehydroabietinyl amine increased the reflectance to only 53 to 54%.

EXAMPLE 2

A series of condensation products of ethylene oxide with dehydroabietinyl amine were prepared in a manner similar to that disclosed in Example 1. The mol ratio of ethylene oxide to dehydroabietinyl amine was varied from 4 to 37 in the series. The properties of the products are given in the following tables.

Table I

| Products | Ethylene Oxide/Amine Mol Ratio | Form | Clarity |
|---|---|---|---|
| A | 4 | Viscous Fluid | Translucent. |
| B | 18 | Liquid and Solid | Do. |
| C | 28 | Pasty Solid | Opaque. |
| D | 32 | Waxy Solid | Do. |
| E | 32 | ___do___ | Do. |
| F | 37 | ___do___ | Do. |

Table II

| Products | Freezing Range, °C. | pH (1% Aqueous Solution) |
|---|---|---|
| A | 27–20 | 10.7 |
| B | 23–20 | 10.2 |
| C | 34–30 | 10.1 |
| D | 41–38 | 10.0 |
| E | 41–37 | 10.1 |
| F | 43–38 | 10.0 |

Table III

Foam test (0.05% of aqueous solution)

[Height of foam in mms.]

| Products | Initial | After 30 Secs. | After 2 Mins. | After 3 Mins. |
|---|---|---|---|---|
| A | 15 | 15 | 14 | 14 |
| B | 73 | 64 | 53 | 46 |
| C | 73 | 72 | 60 | 51 |
| D | 80 | 69 | 60 | 44 |
| E | 95 | 89 | 72 | 41 |
| F | 72 | 68 | 52 | 39 |

The products were tan to cream colored and had only a slight odor.

As indicated in the foregoing examples, the condensation products of the invention are suitable as washing or foaming agents, and in addition, are suitable for emulsifying and wetting purposes in aqueous solutions, as well as in breaking oil-in-water emulsions.

Variations which will be obvious to those skilled in the art can be made in the compositions and processes described above without departing from the spirit or scope of the invention.

I claim:

1. As a novel composition of matter, soluble in water and having surface-active properties therein, an N-polyethenoxylated dehydroabietinyl amine containing 4 to 40 ethenoxy radicals per mol of said amine.

2. A composition as defined in claim 1, having outstanding detergent properties, containing 8 to 30 ethenoxy radicals per mol of dehydroabietinyl amine.

3. A composition as defined in claim 2, having outstanding detergent properties, containing 8 to 15 ethenoxy radicals per mol of dehydroabietinyl amine.

4. A semi-solid to paste-like solid, opaque composition as defined in claim 7, suitable for use as a pickling inhibitor, containing 16 to 30 ethenoxy radicals per mol of dehydroabietinyl amine.

5. A wax-like solid, opaque composition as defined in claim 7, suitable for resolving water-in-oil emulsions, containing 35 to 40 mols of ethylene oxide per mol of dehydroabietinyl amine.

6. A process for the preparation of a surface-active composition, which comprises condensing dehydroabietinyl primary amine with 4 to 40 mols of ethylene oxide by heating at a temperature from 120–180° C. in the presence of an alkaline-reacting catalyst.

7. As a novel composition of matter soluble in water and having surface active properties therein, a viscous liquid to wax-like solid, translucent to opaque N-polyethenoxylated dehydroabietinylamine containing 4 to 40 ethenoxy radicals per molecule of said amine.

8. A viscous liquid to paste-like solid composition as defined in claim 7, having outstanding detergent properties, and containing 8 to 30 ethenoxy radicals per molecule of dehydroabietinylamine.

9. A viscous liquid to semi-solid, translucent composition as defined in claim 7, having outstanding detergent properties and containing 8 to 15 ethenoxy radicals per molecule of dehydroabietinylamine.

References Cited in the file of this patent

UNITED STATES PATENTS

| | | |
|---|---|---|
| 2,194,429 | Krzikalla | Mar. 19, 1940 |
| 2,194,906 | Krzikalla | Mar. 26, 1940 |
| 2,510,063 | Bried | June 6, 1950 |
| 2,510,284 | Haggard | June 6, 1950 |

FOREIGN PATENTS

| | | |
|---|---|---|
| 467,571 | Great Britain | June 16, 1937 |

OTHER REFERENCES

Borglin: Soap and Sanitary Chemistry, December 1947, pp. 147, 149 and 167.